United States Patent [19]

Blount et al.

[11] Patent Number: 4,923,958

[45] Date of Patent: May 8, 1990

[54] NOVEL UNSATURATED POLYESTERS

[75] Inventors: William W. Blount, Surgoinsville; Joseph R. Zoeller, Kingsport, both of Tenn.

[73] Assignee: Eastman Kodak Company, Rochester, N.Y.

[21] Appl. No.: 387,314

[22] Filed: Jul. 28, 1989

[51] Int. Cl.$^5$ ............................................. C08G 63/02
[52] U.S. Cl. .................................. 528/272; 528/288; 528/291; 528/296; 528/303; 528/304; 528/308; 525/437
[58] Field of Search ............... 528/272, 288, 291, 296, 528/303, 304, 308; 525/437

[56] References Cited

U.S. PATENT DOCUMENTS

| | | | |
|---|---|---|---|
| 3,969,560 | 7/1976 | Lewis et al. | 428/90 |
| 4,189,452 | 2/1980 | Haddad et al. | 525/444 |
| 4,273,701 | 6/1981 | Feldman et al. | 523/514 |

Primary Examiner—John Kight, III
Assistant Examiner—S. A. Acquah
Attorney, Agent, or Firm—J. Frederick Thomsen; William P. Heath, Jr.

[57] ABSTRACT

Disclosed are novel unsaturated polyesters comprised of (i) 2-butenedioic acid residues; (ii) diol residues; and (iii) residues of novel 1,5-diaryl-3-pentanols having the structure

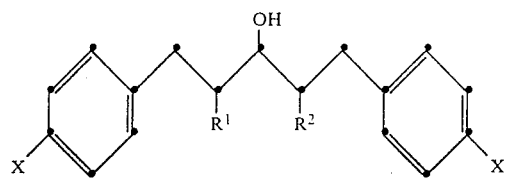

wherein $R^1$ and $R^2$ each is hydrogen, alkyl or phenyl or collectively $R^1$ and $R^2$ are 1,2- or 1,3-alkylene or 1,2-phenylene; and each X is carboxyl, alkoxycarbonyl, hydroxyalkoxycarbonyl, formamido, alkanoylamido or hydroxyalkoxy. Also disclosed are curable compositions containing admixtures of the unsaturated polyesters and aromatic vinyl compounds copolymerizable with the unsaturated polyesters and coating and casted and molded articles obtained from the curable compositions.

18 Claims, No Drawings

NOVEL UNSATURATED POLYESTERS

This invention concerns certain novel unsaturated polyesters which may be combined with a vinyl aromatic compound such as styrene which may be cured, i.e., copolymerized, to produce coatings and casted or molded articles which possess excellent solvent resistance. More particularly, this invention pertains to unsaturated polyesters based on residues of 2-butenedioic acid and certain 1,5-diaryl-3-pentanols.

Environmental concerns over the escape of petroleum products from underground steel storage tanks led to the formation of the U.S. government's Leaking Underground Storage Tank (LUST) program. Underwriters Laboratories Standard UL 1316 covers spherical or horizontal, cylindrical, atmospheric-type tanks of glass fiber-reinforced plastic (FRP) that are intended for underground storage of petroleum-based flammable and combustible liquids. Furthermore, it applies to other constructs such as a steel liner within a glass fiber-reinforced plastic shell. To prevent leaks and spills and thereby protect groundwater from contamination, it is apparent that the FRP must be fabricated from corrosion- and solvent-resistant materials.

The majority of the thermoset resins used in the FRP industry are based on linear, unsaturated polyesters derived from maleic anhydride, diacids such as adipic acid, isophthalic acid and phthalic anhydride and diols such as 1,2-propanediol and 2,2-dimethyl-1,3-propanediol. Varying degrees of corrosion and solvent resistance may be obtained by carefully selecting the types and ratios of monomers and processing them to a particular molecular weight or other parameter using techniques that are well known to polymer chemists. Alternatively, additives may be included in the resin to improve its corrosion or solvent resistance.

We have discovered a class of unsaturated polyesters which exhibit improved resistance to active solvents and therefore are especially useful in formulating FRP composites which meet UL 1316 standards. The novel unsaturated polyesters provided by this invention are comprised of:

A. 2-butenedioic acid residues;
B. diol residues; and
C. residues of certain novel 1,5[diaryl-3-pentanols having the structure

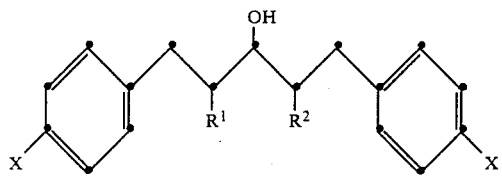

wherein:

$R^1$ and $R^2$ each is hydrogen, alkyl containing up to about 6 carbon atoms or phenyl or collectively $R^1$ and $R^2$ are 1,2- or 1,3-alkylene or 1,2-phenylene; and each X is carboxyl, alkoxycarbonyl of up to about 7 carbon atoms, hydroxylkoxycarbonyl of up to about 9 carbon atoms, formamido, alkanoylamido having up to about 6 carbon atoms or hydroxyalkoxy having up to about 10 carbon atoms. The novel polyesters typically have a number average molecular weight in the range of about 1000 to 5000 with the range of about 1500 to 3000 being preferred and a number average molecular weight of about 2000 being particularly preferred. The polyesters, in general, have an acid number (mg of potassium hydroxide per g of polyester) of less than 40, e.g., 5 to 35 with the preferred acid number being in the range of about 15 to 25. Normally, the 2-butenedioic acid and component C residues each constitute about 5 to 40 weight percent of the unsaturated polyester.

The 2-butenedioic acid residues, i.e., residues having the structure:

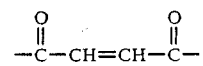

present in our novel polyesters may be derived from maleic anhydride, maleic acid or fumaric acid. A portion, e.g., up to about one-third, of the 2-butenedioic acid residues may be replaced with residues of other monomers, such as tetrahydrophthalic anhydride (tetrahydro-1,3-isobenzofurandione) and itaconic acid (2,3-dicarboxypropene), which are reactive with styrene or other vinyl aromatic compounds. However, even when such another styrene-reactive monomer residue is present, at least 5 weight percent of the polyester will be made up of 2-butenedioic acid residues. The 2-butenedioic acid residues preferably are derived from maleic anhydride and constitute about 20 to 30 weight percent of the unsaturated polyester.

Diol residues B may be derived from one or more aliphatic, alicyclic or aliphatic-aromatic diols containing up to about 10 carbon atoms. Examples of such diols include ethylene glycol, 1,2- and 1,3-propanediol, 2,2-dimethyl-1,3-propanediol, diethylene glycol, triethylene glycol, dipropylene glycol, tripropylene glycol, 2-ethyl-2-butyl-1,3-propanediol, 2-ethyl-2-isobutyl 1,3-propanediol, 1,3-butanediol, 1,4-butanediol, 1,5-pentanediol, 1,6-hexanediol, 2,4-dimethyl-2-ethylhexane-1,3-diol, 2,2,4-trimethyl-1,3-pentanediol, thiodiethanol, 1,2-, 1,3- and 1,4-cyclohexanedimethanol, 2,2,4,4-tetramethyl-1,3-cyclobutanediol, 1,4-xylylenediol, 1,3- and 1,4-bis(2-hydroxyethoxy)benzene and the like. Diol residues B preferably are derived from 1,2-propanediol and/or 2,2-dimethyl-1,3-propanediol.

The polyesters also may include the residues of one or more other aliphatic, alicyclic and aromatic dicarboxylic acids containing about 4 to 10 carbon atoms such as the residues of succinic, glutaric, adipic, azelaic, sebacic, 1,2-, 1,3- and 1,4-cyclohexanedicarboxylic, phthalic, isophthalic and/or terephthalic acids. These diacid residues may be derived from the dicarboxylic acids or from ester-forming derivatives such as dialkyl esters and/or anhydrides and may constitute up to about 30 weight percent of the polyesters. These optional diacid residues preferably are selected from the residues of adipic, azelaic, phthalic and/or isophthalic acid.

The residues of conventional trifunctional monomers such as trimethylolethane, trimethylolpropane, glycerin, trimellitic anhydride and 2,2-trimethylolpropionic acid residues may constitute up to 15 weight percent of our novel polyesters. When such trifunctional residue exceeds about 5 weight percent of the polyester, the amount of component C will be reduced by a corresponding amount.

A preferred group of the polyesters of this invention have a number average molecular weight in the range of about 1500 to 3000 and are comprised of A. about 22 to 28 weight percent 2-butenedioic acid residues;

B. about 32 to 42 weight percent 1,2-propanediol and/or 2,2-dimethyl-1,3-propanediol residues;

C. about 20 to 30 weight percent of the residue of a trifunctional compound of formula (I) wherein $R^1$ and $R^2$ each is hydrogen or methyl or $R^1$ and $R^2$ collectively are 1,3-propanediyl and each X is carboxyl or alkoxycarbonyl, preferably methoxycarbonyl or ethoxycarbonyl; and D. up to about 22 weight percent of the residues of adipic, azelaic, phthalic and/or isophthalic acid.

A second preferred group of the polyesters have a number average molecular weight in the range of about 1500 to 3000 and are comprised of A. about 22 to 28 weight percent 2-butenedioic acid residues;

B. about 20 to 40 weight percent 1,2-propanediol and/or 2,2-dimethyl-1,3-propanediol residues;

C. about 25 to 35 weight percent of the residue of a triol compound of formula (I) wherein $R^1$ and $R^2$ each is hydrogen or methyl or $R^1$ and $R^2$ collectively are 1,3-propanediyl and each X is hydroxyalkoxy, preferably 2-hydroxyethoxy or 2-hydroxypropoxy; and D. up to about 30 weight percent of the residues of adipic, azelaic, phthalic and/or isophthalic acid.

The novel 1,5-bis(4'-substituted-aryl)-3-pentanols described hereinabove are prepared by the steps comprising:

(1) reacting a 4'-substituted-benzaldehyde having the formula

with a ketone having the formula

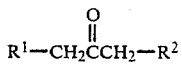

in the presence of an acidic or basic condensation catalyst to obtain a 1,5-bis(4,'-substituted-aryl)penta-1,4-dien-3-one intermediate compound having the formula

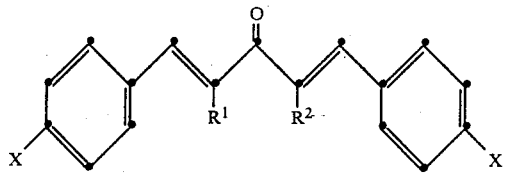

(2) hydrogenating the intermediate compound in the presence of a catalytic amount of a hydrogenation catalyst selected from mixed copper-chromium oxides and supported Group VIII noble metals under hydrogenation conditions of pressure and temperature.

The polyesters provided by this invention may be prepared using procedures analogous to those used in the preparation of known unsaturated polyesters. The monomers may be combined and heated at temperatures in the range of about 120° to 200° C. in two or more stages wherein one of the stages consists of the addition of the monomer, e.g., maleic anhydride, from which the 2-butenedioic acid residue is obtained. Normally, a predetermined amount of maleic anhydride, e.g., from about 20 to 30 weight percent based on the total weight of the desired average number molecular weight of the polyester, is used to provide sufficient reactivity or cure with a vinyl aromatic compound.

The amount of each monomer used is determined from two equations, a "K Value" equation (molecular weight parameter) and an "R Value" equation (hydroxyl excess parameter). The "K Value" equation, $$K = M_t/E_a = \frac{1}{1 - 1/n} \qquad \text{Equation I}$$

is a ratio of the total number of molecules ($M_t$) of the monomers in an average polyester molecule to the total equivalents of reactive carboxyl ($E_a$) which is related to the number average molecular weight of the polyester wherein n is the total number of monomer units present in an average polyester molecule or chain. For the polyesters prepared in the examples below, an average number molecular weight of 2000 was selected. Using an approximate average monomer molecular weight of 100, the value of n is 20. When n=20 is substituted in Equation I, a K Value of 1.05 is obtained.

The "R Value" (excess hydroxyl parameter), $$R = E_b/E_a \qquad \text{Equation II}$$

is the ratio of total equivalents of reactive hydroxyl groups ($E_b$) to the total equivalents of reactive carboxyl groups ($E_a$) wherein $E_b$ is the total equivalents of reactive hydroxyl groups present in or on the monomers constituting an average polyester molecule and $E_a$ is the total equivalents of reactive carboxyl groups present in or on the monomers constituting an average polyester molecule.

Equations I and II can be solved simultaneously to obtain the amount of each reactant monomer required to prepare the polyester desired. For compounds of formula (I) (component C) having mixed functionality, i.e., when X of formula (I) is carboxyl or alkoxycarbonyl, the amounts of such compounds that are required are distributed proportionally between the equivalents of reactive carboxyl and reactive hydroxyl based on the ratio of reactive carboxyl and hydroxyl groups present on the compound.

The molecular weight and the amounts of the monomer residues of the polyesters thus can be defined by their K and R Values. For example, the first of the preferred groups of the polyesters, i.e., those in which component C contains 2 carboxyl or alkoxycarbonyl groups, has a K value in the range of about 1.01 to 1.16 and an R Value in the range of about 1.05 to 1.35. The second preferred group, i.e., those in which component C is a triol, has a K value in the range of about 1.02 to 1.25 and an R Value in the range of about 1.05 to 1.45

The polyesters of our invention are further illustrated by the following examples.

EXAMPLE 1

A polyester having a number average molecular weight of 2000 and consisting of the residues of 1,2-propanediol (PG), maleic anhydride (MA), isophthalic acid (IPA) and 1,5-bis(4-carboxyphenyl)-3-pentanol (Ia) was designed using a K Value of 1.05, an R Value of 1.20 and a maleic anhydride content of 25 weight percent (based on the weight of the polyester) to give satisfactory cure, i.e., to provide the polyester with adequate reactivity with styrene. The amount of each reactant used is set forth below and was determined using Equations I and II as described above.

| Reactant | Moles | Mole Percent | Equiv. | Amount Used, g |
|---|---|---|---|---|
| Hydroxyl Component | | | | |
| PG | 4.580 | 94.30 | 9.160 | 348.1 |
| Ia | 0.277 | 5.70 | 0.832 | 90.9 |
| Carboxyl Component | | | | |
| IPA | 0.778 | 20.03 | 1.556 | 129.1 |
| MA | 2.551 | 65.68 | 5.102 | 250.0 |
| Ia | 0.555 | 14.29 | 1.664 | 182.0 |

K Value = $M_t/E_a$ = 8.741/8.322 = 1.05
R Value = $E_b/E_a$ = 9.992/8.322 = 1.20

The polymerization was carried out in two stages in a two-liter, three-necked, reaction flask equipped with a stirrer, a steam-jacketed partial condenser and a glass fitting holding a nitrogen sparge tube and thermocouple wires. In the first stage, the maleic anhydride and Ia were charged to the flask and heated at 150° C. for one hour. The remaining reactants were then added (second stage) and the resulting mixture was heated for two hours at temperature increments of 170° C., 180° C. and 190° C. While heating at 190° C., the acid value (mg potassium hydroxide per g polyester) was monitored until a value of less than 25 was obtained. The reaction mixture was cooled to 120° C. and styrene monomer containing hydroquinone polymerization inhibitor was added to give an unsaturated polyester composition consisting of 55 weight percent unsaturated polyester, 45 weight percent styrene and 100 ppm hydroquinone.

EXAMPLE 2

A polyester having a number average molecular weight of 2000 and consisting of the residues of 2,2-dimethyl-1,3-propanediol (NPG), maleic anhydride (MA), isophthalic acid (IPA) and 1,5-bis(4-methoxycarbonylphenyl)-3-pentanol (Ib) was designed using a K Value of 1.05, an R Value of 1.20 and a maleic anhydride content of 25 weight percent (based on the weight of the polyester) to give satisfactory cure. The amount of each reactant used is set forth below and was determined using Equations I and II as described above.

| Reactant | Moles | Mole Percent | Equiv. | Amount Used, g |
|---|---|---|---|---|
| Hydroxyl Component | | | | |
| NPG | 4.127 | 94.29 | 8.254 | 429.8 |
| Ib | 0.250 | 5.71 | 0.750 | 89.0 |
| Carboxyl Component | | | | |
| IPA | 0.450 | 12.85 | 0.900 | 74.7 |
| MA | 2.551 | 72.87 | 5.102 | 250.0 |
| Ib | 0.500 | 14.28 | 1.500 | 178.0 |

K Value = $M_t/E_a$ = 7.878/7.502 = 1.05
R Value = $E_b/E_a$ = 9.004/7.502 = 1.20

The polymerization was carried out according to the procedure described in Example 1 and the polyester obtained was combined with styrene to give a polyester-styrene composition containing 55 weight percent unsaturated polyester, 45 weight percent styrene and 100 ppm hydroquinone.

EXAMPLE 3

A polyester having a number average molecular weight of 2000 and consisting of the residues of 1,2-propanediol (PG), 1,5-bis(2-hydroxyethoxyphenyl)-3-pentanol (Ic), maleic anhydride (MA) and isophthalic acid (IPA) was designed using a K Value of 1.05, an R Value of 1.20 and a maleic anhydride content of 25 weight percent (based on the weight of the polyester) to give the polyester adequate reactivity with styrene. The amount of each reactant used is set forth below and was determined using Equations I and II as described above.

| Reactant | Moles | Mole Percent | Equiv. | Amount Used, g |
|---|---|---|---|---|
| Hydroxyl Component | | | | |
| PG | 3.750 | 81.82 | 7.501 | 285.3 |
| Ic | 0.833 | 18.18 | 2.500 | 300.0 |
| Carboxyl Component | | | | |
| IPA | 1.618 | 38.81 | 3.235 | 268.8 |
| MA | 2.551 | 61.19 | 5.102 | 250.0 |

K Value = $M_t/E_a$ = 8.752/8.337 = 1.05
R Value = $E_b/E_a$ = 10.01/8.337 = 1.20

The polymerization was carried out in two stages in a two-liter, three-necked, reaction flask equipped with a stirrer, a steam-jacketed partial condenser and a glass fitting holding a nitrogen sparge tube and thermocouple wires. In the first stage, the 1,2-propanediol, Ic and isophthalic acid were charged to the flask and heated for one hour at each temperature increment of 160° C., 170° C., 180° C. and 190° C. After cooling the mixture to 120° C., the maleic anhydride was added (second stage) and the temperature was raised to 190° C. over a two-hour period. The acid value was monitored until a value of less than 25 was obtained. The reaction mixture was cooled to 120° C. and styrene monomer containing hydroquinone polymerization inhibitor was added to give an unsaturated polyester composition consisting of 55 weight percent unsaturated polyester, 45 weight percent styrene and 100 ppm hydroquinone.

COMPARATIVE EXAMPLE 1

A control polyester described in U.S. Pat. No. 4,189,452 was prepared from 1,2-propanediol, isophthalic acid and maleic anhydride substantially as described in the cited patent. The amounts of monomers used and the K and R Values for the polyester are shown below.

| Reactant | Moles | Mole Percent | Equiv. | Amount Used, g |
|---|---|---|---|---|
| Hydroxyl Component | | | | |
| PG | 2.500 | 100.00 | 5.000 | 190.0 |
| Carboxyl Component | | | | |
| IPA | 1.000 | 50.01 | 2.000 | 166.1 |
| MA | 1.000 | 50.09 | 2.000 | 98.0 |

K Value = $M_t/E_a$ = 4.500/4.000 = 1.125
R Value = $E_b/E_a$ = 5.000/4.000 = 1.250

The polyester obtained was combined with styrene to give a polyester-styrene composition containing 55 weight percent unsaturated polyester, 45 weight percent styrene and 100 ppm hydroquinone.

The unsaturated polyesters of our invention may be combined with one or more copolymerizable, monomeric aromatic vinyl compounds to obtain curable polyester compositions useful in the preparation of solvent-resistant coatings and casted or molded articles. Examples of the aromatic vinyl compounds include styrene, p-methyl-styrene, vinyl toluene, the various alpha substituted styrenes, chlorinated styrenes, divinyl benzene and the like. The curable polyester compositions thus afforded by our invention typically are comprised of about 30 to 60, preferably about 40 to 50, weight percent of the copolymerizable, monomeric aromatic vinyl compound. Styrene is the most preferred of the aromatic vinyl compounds.

The curable, unsaturated polyester compositions usually contain a phenolic polymerization inhibitor to prevent premature polymerization of a part or all of the compositions. Hydroquinone monomethyl ether (p-methoxyphenol), mono-tertiary-butyl hydroquinone, toluhydroquinone and, especially, hydroquinone are typical polymerization inhibitors which may be used. The phenolic compounds normally are employed in polymerization-inhibiting amounts of 50 to 500 ppm.

The curable, unsaturated polyester compositions described hereinabove may be cured, i.e., copolymerized with the vinyl aromatic compound, according to known techniques by mixing a peroxide and, optionally, a promotor with the compositions and then applying the resulting mixtures to various substrates or forming the mixture into a shaped article. Examples of the peroxides which may be used include methyl ethyl ketone peroxide, benzoyl peroxide, lauroyl peroxide, tertiary butyl perbenzoate and dicumyl peroxide. Cobalt and vanadium salts of carboxylic acids such as cobalt 2-ethylhexanoate, cobalt naphthenate and vanadium 2-ethylhexanoate are examples of the promotors which may be used. The metal salts may be used in combination with copromotors such as 2,4-pentanedione, alkyl aceto-acetates, phenyldiethanolamine, dimethylaniline and the like.

The use of the curable polyester compositions provided by this invention to produce cured, shaped articles is further illustrated by the following examples.

EXAMPLES 4-6 and COMPARATIVE EXAMPLE 2

To each of the curable, unsaturated polyesterstyrene monomer compositions described in Examples 1-3 and Comparative Example 1 was added 0.5 weight percent of a solution of cobalt 2-ethylhexanoate in mineral spirits (6% active cobalt) to give a [Co] concentration of 0.03 weight percent. Castings having a thickness of one-eighth inch were prepared from each of the four compositions by mixing 1.2 g of methyl ethyl ketone peroxide (60% in dimethyl phthalate) with 100 g of each composition and then pouring the mixtures into a 164 mm diameter by 7 mm deep metal mold (a one gallon paint can lid). After each composition had cured (polymerized) to a Barcol Indentation Hardness of at least 30 (plate glass=100), samples of the castings were evaluated for solvent resistance by submerging them in acetone. The days each sample remained submerged in acetone before failure, as determined by dissolution of the sample or loss of sample integrity, whichever occurred first, were recorded. Samples of each of the curable compositions were determined to possess adequate reactivity as determined by standard gel time and peak exotherm testing.

The results of the acetone resistance tests (in days to failure) and the Barcol Hardness, gel time (minutes) and peak exotherm temperature (Peak Temp., ° F.) of each sample of the casted compositions are set forth in the following Table. The curable polyester-styrene compositions described in each of Examples 1, 2 and 3 and Comparative Example 1 were used in Examples 4, 5 and 6 and Comparative Example 2 (C-2), respectively.

TABLE

| Example | Acetone Resistance | Barcol Hardness | Gel Time | Peak Temp. |
|---------|-------------------|-----------------|----------|------------|
| 4       | 28                | 25              | 5        | 380        |
| 5       | 21                | 25              | 5        | 350        |
| 6       | 21                | 25              | 4        | 360        |
| C-2     | 14                | 45              | 10       | 375        |

The following reference examples describe procedures which may be used to prepare the compounds of formula (I).

REFERENCE EXAMPLE 1

Acetone (14.5 g, 18.3 mL, 0.25 mol) is added to a solution of methyl 4-formylbenzoate (MFB, 90.3 g, 0.55 mol) prepared and maintained under an inert atmosphere in a 1 L, 3-necked, round-bottom flask equipped with a mechanical stirrer. The flask is placed in a cold water bath and a solution of sodium hydroxide (2.5 g, 0.0625 mol) in 25 mL of equal parts by weight methanol and water is added slowly using an addition funnel. Commencement of reaction is slow, presumably because of acidic impurities in the MFB. The reaction mixture initially turns yellow and as the reaction progresses a light yellow precipitate forms which subsequently becomes a thick slurry. After 2.5 hours the reaction mixture is filtered and the crude product obtained is washed with methanol until the wash solution is no longer a dark color. The product is air dried on the filter to yield 82.9 g (95% of theory) of 1,5-bis(4'-methoxycarbonylphenyl)penta-1,4-dien 3-one, which may be further purified, if desired, by recrystallization from acetic acid or xylene. Analytical results are consistent with the structure expected:

HNMR(CDCL3, 270 MHz): del=3.93 (s,6H), 7.15 (d,2H, J=16 Hz), 7.68 (d,4H, J=10 Hz), 7.76 (d,2H, J=16 Hz), 8.09 (d,4H, J=10 Hz).

IR (KBr): 1720, 1653, 1284 cm(−1).

Elemental analysis: Calc. for $C_{21}H_{18}O_5$: C,71.99; H,5.18.

Found: C,71.98; H,5.15.

Melting point: 221°–223° C.

An autoclave containing a mixture of 1,5-bis(4'-methoxycarbonylphenyl)penta-1,4-dien-3-one (175.0 g, 0.5 mol), mixed copper-chromium oxide catalyst (17.5 g,) and toluene is pressurized to 250 psi with hydrogen and then heated to 180° C. at which time the total pressure is adjusted to 1000 psi. After maintaining the temperature at 180° C. and the pressure at 1000 psi for 5 hours, the autoclave is cooled and vented. The contents of the autoclave are transferred to and heated in a 2 L Erlenmeyer flask to above 90° C. and filtered using a pad of Celite filter aid (to assist in catalyst removal) and a steamjacketed Buchner funnel. The filtrate is cooled to room temperature and filtered to give 142.1 g of product, 1,5-bis(4-methoxycarbonylphenyl)-3-pentanol, as a white, fluffy, crystalline material. The volume of the filtrate is reduced 500–600 mL, heated to dissolve the resulting precipitate and cooled to recrystallize the residual product. Filtration of the mixture gives 13.9 g of additional product. A second volume reduction to about 250 mL gives an additional 5.2 g of product. The three crops of crystals are indistinguishable by chromatography and total 161.2 g, 91% of theory.

HNMR (CDC13, 270 MHz): del=1.81 (t,4H), 2.77 (m,4H), 3.88 (s,6H), 7.21 (d,4H), 7.91 (d,4H).

IR (KBr): 1720, 1290 cm(−1); (mull) 3460 (cm−1).

FDMS: M+/e=356.

Elemental analysis: Calc. for $C_{21}H_{24}O_5$: C,70.77; H,6.79.

Found: C,71.09; H,6.68.

Melting point: 129°–130° C.

The mixed copper-chromium oxide catalyst employed in this example may be obtained from Harshaw Chemical Company (Cu-1800P) or Aldrich Chemical Company (copper chromite). Three different mixed copper-chromium oxide catalysts, all having the gross stoichiometry $CuO—Cr_2O_3$, did not vary noticeably in performance.

REFERENCE EXAMPLE 2

The procedure described in Reference Example 1 is repeated using 4-(2'-hydroxy)ethoxybenzaldehyde in place of MFB and carrying out the reaction for a period of 6 hours to obtain 1,5-bis [4'-(2"-hydroxy)ethoxyphenyl-penta-1,4-dien-3-one in a 95% yield. Analytical results are consistent with the expected structure:

HNMR (CDC13, 270 MHz): del=3.88 (quart.,4H), 4.11 (t,4H), 4.69 (t,2H), 6.96 (d,4H, J=9 Hz), 7.00 (d,2H, J=16 Hz), 7.66 (d,4H, J=9 Hz), 7.69 (d,2H, J=16 Hz).

IR (KBr): 3100-3600 cm(−1) (s,v. br.), 1650 cm(−1) (s).

FDMS: 354.

Melting point: 169°–170° C.

Using essentially the same hydrogenation procedure as described in Reference Example 1, 1,5-bis[4'-(2"hydroxy)ethoxyphenyl]-3-pentanol is obtained in a yield of 72% by hydrogenating 1,5-bis[4-(2-hydroxy)ethoxyphenyl]penta-1,4-dien-3-one in the presence of mixed copper-chromium oxide catalyst. The identity of the product is confirmed by analyses:

HNMR(CDCl3, 270 MHz): del=1.68-1.82 (m,4H), 1.88 (s,3H), 2.55-2.77 (m,4H), 3.57-3.66 (m,1H), 3.95 (t,4H), 4.06 (t,4H), 6.83 (d,4H), 7.08 (d,4H).

IR (KBr): 3100-3600 cm(−1) (5,v.br.).

FDMS: M+/e=360.

Elemental analysis: Calc: C, 69.98; H, 7.83.

Found: C, 70.22; H, 8.01.

Melting point: 103°–104° C.

The invention has been described in detail with particular reference to preferred embodiments thereof, but it will be understood that variations and modifications will be effected within the spirit and scope of the invention.

We claim:

1. An unsaturated polyester comprised of
   A. 2-butenedioic acid residues;
   B. diol residues; and
   C. residues of 1,5-diaryl-3-pentanols having the structure wherein:

$R^1$ and $R^2$ each is hydrogen, alkyl containing up to about 6 carbon atoms or phenyl or collectively $R^1$ and $R^2$ are 1,2- or 1,3-alkylene or 1,2-phenylene; and each X is carboxyl, alkoxycarbonyl of up to about 7 carbon atoms, hydroxyalkoxycarbonyl of up to about 9 carbon atoms, formamido, alkanoylamido having up to about 6 carbon atoms or hydroxyalkoxy having up to about 10 carbon atoms.

2. An unsaturated polyester according to claim 1 having a number average molecular weight of about 1000 to 5000 containing residues of one or more diacids in addition to components A and C.

3. An unsaturated polyester according to claim 1 having a molecular weight of about 1500 to 3000 containing about 20 to 30 weight percent, based on the weight of the polyester, of 2-butenedioic acid residues wherein component C consists of residues of 1,5-diaryl-3-pentanols having the structure wherein $R^1$ and $R^2$ each is hydrogen or methyl or $R^1$ and $R^2$ collectively are 1,3-propanediyl and each X is carboxyl, alkoxycarbonyl of up to about 7 carbon atoms or hydroxyalkoxy having up to about 10 carbon atoms.

4. An unsaturated polyester having a number average molecular weight of about 1500 to 3000 comprised of:
   A. about 22 to 28 weight percent 2-butenedioic acid residues;
   B. about 32 to 42 weight percent 1,2-propanediol and/or 2,2-dimethyl-1,3-propanediol residues;
   C. about 20 to 30 weight percent of the residue of a trifunctional compound having the structure wherein $R^1$ and $R^2$ each is hydrogen or methyl or $R^1$ and $R^2$ collectively are 1,3-propanediyl and each X is carboxyl or alkoxycarbonyl of up to about 7 carbon atoms; and D. up to about 22 weight percent of the residues of adipic, azelaic, phthalic and/or isophthalic acid.

5. An unsaturated polyester according to claim 4 having a number average molecular weight of about 1500 to 3000 comprised of:
A. about 22 to 28 weight percent 2-butenedioic acid residues derived from maleic anhydride;
B. about 32 to 42 weight percent 1,2-propanediol;
C. about 20 to 30 weight percent of the residue of a trifunctional compound having the structure

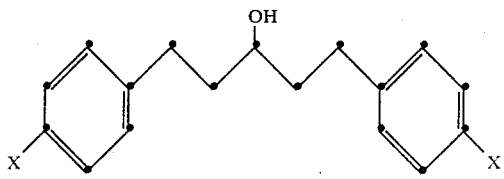

wherein each X is carboxyl, methoxycarbonyl or ethoxycarbonyl; and
D. about 10 to 20 weight percent of the residues of adipic, azelaic, phthalic and/or isophthalic acid.

6. An unsaturated polyester having a number average molecular weight of about 1500 to 3000 comprised of:
A. about 22 to 28 weight percent 2-butenedioic acid residues;
B. about 20 to 40 weight percent 1,2-propanediol and/or 2,2-dimethyl-1,3-propanediol residues;
C. about 25 to 35 weight percent of the residue of a triol compound having the structure

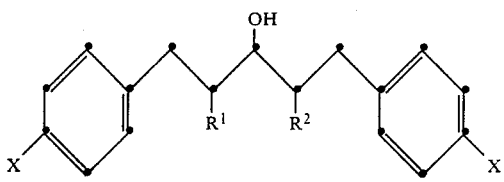

wherein $R^1$ and $R^2$ each is hydrogen or methyl or $R^1$ and $R^2$ collectively are 1,3-propanediyl and each X is hydroxyalkoxy of up to about 10 carbon atoms;
D. up to about 22 weight percent of the residues of adipic, azelaic, phthalic and/or isophthalic acid.

7. An unsaturated polyester according to claim 6 having a number average molecular weight of about 1500 to 3000 comprised of:
A. about 22 to 28 weight percent 2-butenedioic acid residues derived from maleic anhydride;
B. about 20 to 40 weight percent 1,2-propanediol;
C. about 25 to 35 weight percent of the residue of a trifunctional compound having the structure

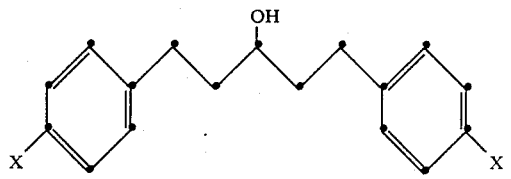

wherein each X is 2-hydroxyethoxy 2-hydroxyethoxy; and
D. about 20 to 30 weight percent of the residues of adipic, azelaic, phthalic and/or isophthalic acid.

8. A curable, unsaturated polyester composition comprising:

I. an unsaturated polyester comprised of
A. 2-butenedioic acid residues;
B. diol residues; and
C. residues of 1,5-diaryl-3-pentanols having the structure

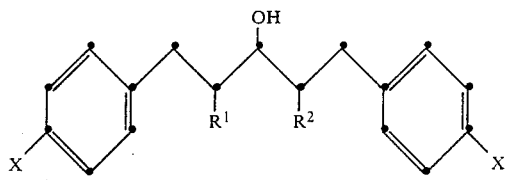

wherein:
$R^1$ and $R^2$ each is hydrogen, alkyl containing up to about 6 carbon atoms or phenyl or collectively $R^1$ and $R^2$ are 1,2- or 1,3-alkylene or 1,2-phenylene; and each X is carboxyl, alkoxycarbonyl of up to about 7 carbon atoms, hydroxyalkoxycarbonyl of up to about 9 carbon atoms, formamido, alkanoylamido having up to about 6 carbon atoms or hydroxyalkoxy having up to about 10 carbon atoms; and
II. an aromatic vinyl compound copolymerizable with the unsaturated polyester.

9. A curable, unsaturated polyester composition comprising:
I. about 40 to 70 weight percent of an unsaturated polyester having a number average molecular weight of about 1500 to 3000 comprised of
A. about 20 to 30 weight percent of 2-butenedioic acid residues;
B. diol residues; and
C. residues of 1,5-diaryl-3-pentanols having the structure

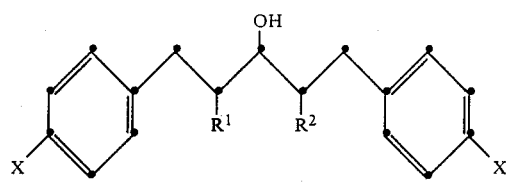

wherein $R^1$ and $R^2$ each is hydrogen or methyl $R^1$ and $R^2$ collectively are 1,3-propanediyl; and each X is carboxyl, alkoxycarbonyl of up to about 7 carbon atoms, or hydroxyalkoxy having up to about 10 carbon atoms; and
II. about 30 to 60 weight percent of an aromatic vinyl compound copolymerizable with the unsaturated polyester.

10. A curable, unsaturated polyester composition comprising:
I. about 40 to 70 weight percent of an unsaturated polyester having a number average molecular weight of about 1500 to 3000 comprised of:
A. about 22 to 28 weight percent 2-butenedioic acid residues;
B. about 32 to 42 weight percent 1,2-propanediol and/or 2,2-dimethyl-1,3-propanediol residues;
C. about 20 to 30 weight percent of the residue of a trifunctional compound having the structure

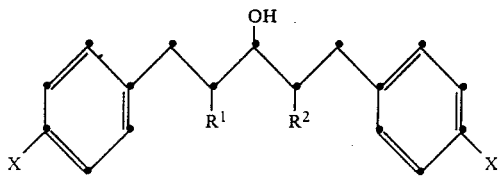

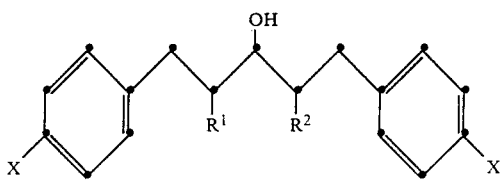

wherein $R^1$ and $R^2$ each is hydrogen or methyl or $R^1$ and $R^2$ collectively are 1,3-propanediyl and each X is carboxyl or alkoxycarbonyl of up to about 7 carbon atoms; and D. up to about 22 weight percent of the residues of adipic, azelaic, phthalic and/or isophthalic acid; and II. an aromatic vinyl compound selected from styrene, p-methylstyrene, vinyl toluene, alpha substituted styrenes, chlorinated styrenes and divinyl benzene.

11. A curable, unsaturated polyester composition according to claim 10 comprised of about 50 to 60 weight percent of the unsaturated polyester and about 40 to 50 weight percent styrene.

12. A curable, unsaturated polyester composition comprising:

I. about 40 to 70 weight percent of an unsaturated polyester having a number average molecular weight of about 1500 to 3000 comprised of:

A. about 22 to 28 weight percent 2-butenedioic acid residues;

B. about 20 to 40 weight percent 1,2-propanediol and/or 2,2-dimethyl-1,3-propanediol residues;

C. about 25 to 35 weight percent of the residue of a triol compound having the structure wherein $R^1$ and $R^2$ each is hydrogen or methyl or $R^1$ and $R^2$ collectively are 1,3-propanediyl and each X is hydroxyalkoxy of up to about 10 carbon atoms;

D. up to about 22 weight percent of the residues of adipic, azelaic, phthalic and/or isophthalic acid; and II. an aromatic vinyl compound selected from styrene, p-methylstyrene, vinyl toluene, alpha substituted styrenes, chlorinated styrenes and divinyl benzene.

13. A coating obtained upon the polymerization of the curable, unsaturated polyester composition defined in claim 8.

14. A coating obtained upon the polymerization of the curable, unsaturated polyester composition defined in claim 10.

15. A coating obtained upon the polymerization of the curable, unsaturated polyester composition defined in claim 12.

16. A casted or molded article obtained upon the polymerization of the curable, unsaturated polyester composition defined in claim 8.

17. A casted or molded article obtained upon the polymerization of the curable, unsaturated polyester composition defined in claim 10.

18. A casted or molded article obtained upon the polymerization of the curable, unsaturated polyester composition defined in claim 12.

* * * * *